Feb. 10, 1925.                                            1,525,529
F. L. WIEDERHOLD
METHOD AND APPARATUS FOR CONTROLLING DEVICES ACCORDING
TO CONDITIONS OF LIGHT
Filed Aug. 1, 1922
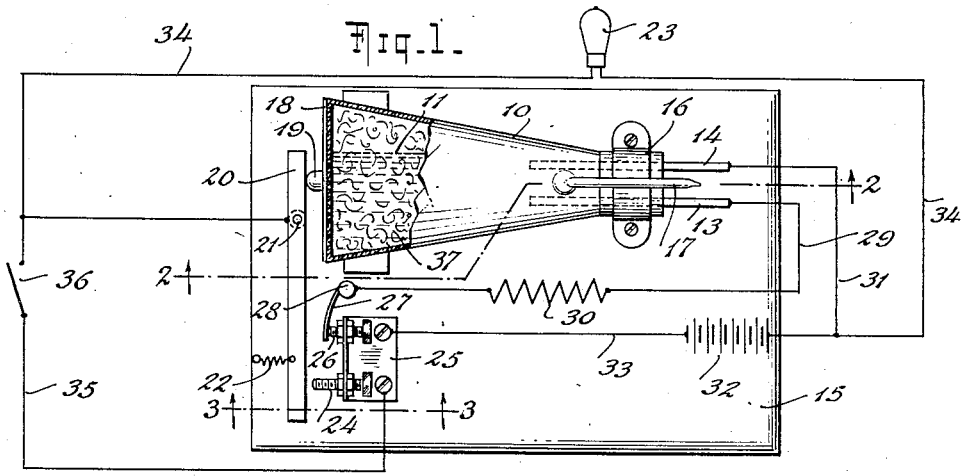
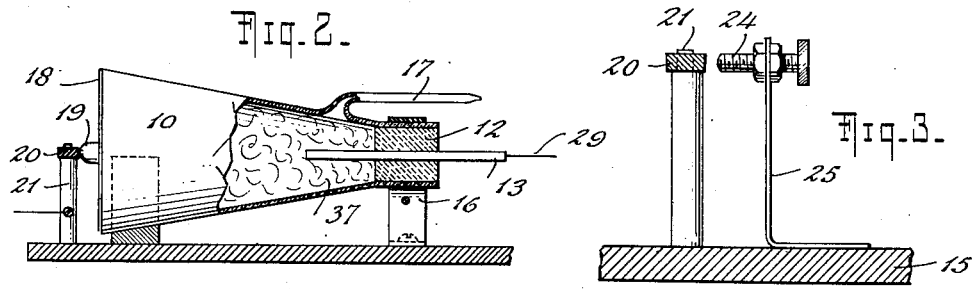
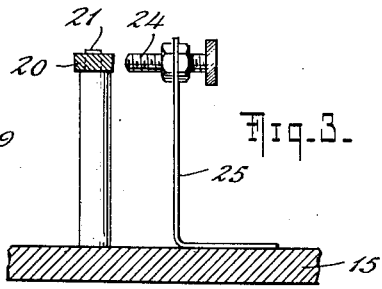
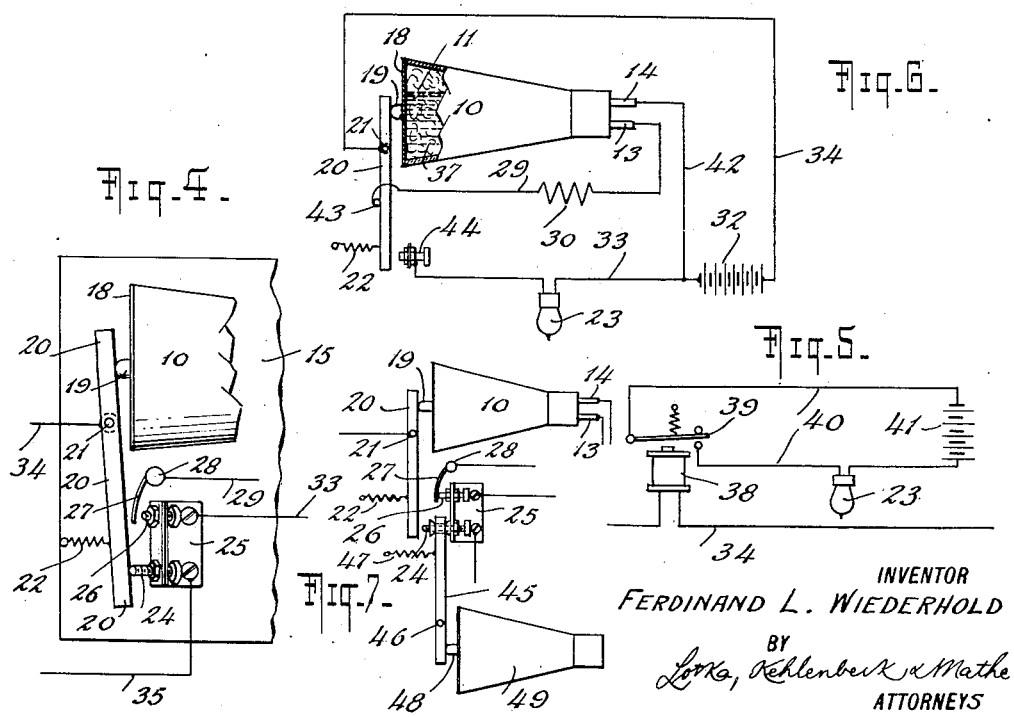
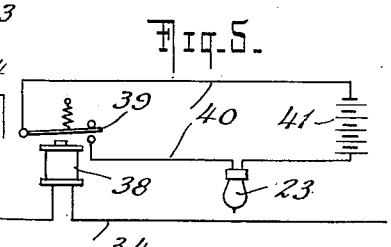
INVENTOR
FERDINAND L. WIEDERHOLD
BY
Locke, Kehlenbeck & Mathe
ATTORNEYS Patented Feb. 10, 1925.

1,525,529

UNITED STATES PATENT OFFICE.

FERDINAND LESLIE WIEDERHOLD, OF PLAINFIELD, NEW JERSEY.

METHOD AND APPARATUS FOR CONTROLLING DEVICES ACCORDING TO CONDITIONS OF LIGHT.

Application filed August 1, 1922. Serial No. 578,990.

*To all whom it may concern:*

Be it known that I, FERDINAND LESLIE WIEDERHOLD, a citizen of the United States, and a resident of Plainfield, in the county of Union and State of New Jersey, have invented certain new and useful Improvements in Methods and Apparatus for Controlling Devices According to Conditions of Light, of which the following is a specification.

My invention relates to the operation of devices which are desired to come into action only under definite conditions of light, for instance to devices for turning on or off electric lights, or gas lights, according to the intensity of the light to which the device is exposed. Thus, an electric light or a gas light may be brought into action automatically in the evening, or whenever it gets dark, while under normal daylight conditions the electric light or gas light will be turned off automatically.

The object of my invention is to provide a method and a device of this character which will be very sensitive, and which will retain such sensitiveness and its efficiency even after prolonged use of the device.

My invention is based on the fact that certain gases, and particularly chlorine and hydrogen, will not combine when in contact with each other in the dark, even if the mixture is permitted to stand for a long time. When exposed to light of sufficient intensity, however, the gases will combine at a rate which depends on the intensity of the light, hydrochloric acid being formed when hydrogen and chlorine are used. The formation of the compound is, according to my invention, accompanied by a reduction of the gas volume. Thus, when chlorine and hydrogen are used, I effect their combination in the presence of a liquid in which hydrochloric acid is soluble to a greater extent than the mixture of hydrogen and chlorine. Therefore, if such mixture and liquid are confined in a suitable vessel, the pressure in said vessel will be reduced by the formation of the compound under the action of light, with practically simultaneous solution of the compound, and the variation of pressure may be utilized to operate a valve, switch or other suitable device which controls the gas light, electric light, or other appliance.

Another feature of my invention consists in novel means for generating the gases which are to combine during periods of relatively great intensity of light, and for automatically throwing the gas-generating means out of action during prolonged periods of relative darkness.

Four examples of my invention will now be described in detail with reference to the accompanying drawings, in which Fig. 1 is a largely diagrammatic front elevation of one form of my invention; Figs. 2 and 3 are partial horizontal sections on lines 2—2 and 3—3 respectively of Fig. 1; Fig. 4 is a partial elevation showing another position of the parts; Fig. 5 is a detail of another form of my invention; Fig. 6 is a diagram of still another form; and Fig. 7 is a partial diagram of a further form of my invention.

The apparatus shown comprises a vessel 10, made entirely or at least partly of glass or like transparent material, so that daylight or other light by which the apparatus is operated, may be able to enter said vessel and to act on the gasses therein. The vessel is shown as flaring toward one end, and is partly filled with a liquid 11 of the character set forth below, the vessel being sealed as indicated at 12; two electrodes 13, 14 of carbon, carborundum, tungsten, tantalum, platinum, or other suitable conducting material project into contact with said liquid. The vessel 10 is secured in any appropriate manner to a base or frame 15, for instance by a clamping band 16. Preferably a partial vacuum (say, a pressure of from 400 to 500 millimeters) is produced in the vessel, the nipple 17 shown in Figs. 1 and 2 serving for connection with a vacuum pump in the usual manner, the end of said nipple or tube being sealed when the desired degree of vacuum has been attained. The liquid contained in the vessel 10 is preferably a mixture of equal volumes of a 50% aqueous solution of calcium chloride and of a 30% aqueous solution of hydrochloric acid. When the pressure within the vessel 10 increases owing to the production of gases therein, under the conditions explained below, the bottom of the vessel will be bulged out slightly, and a metal plate 18, cemented on the outside of said bottom, will by its projection 19 act to swing a lever 20 on its pivot 21. A spring 22 tends to press said lever against the projection 19, so that the lever will follow the movement of the vessel bottom both inward and outward.

The motion of the lever 20 is used to govern the operation of the light or other device to be controlled. In the particular example shown in Fig. 1, I have assumed that the device to be controlled is an electric incandescent bulb 23, which may represent the lamps on a motor car. The mechanism and circuits of Fig. 1 are as follows: The lever 20 is adapted to engage a screw or other contact 24, secured to an elastic bracket or carrier 25, which is fastened to the base or frame 15. This elastic and preferably conducting bracket also carries another contact 26, adapted to engage an elastic metallic strip or other suitable contact 27, secured to said base at 28. The elasticity of the bracket 25 tends to force it toward said contact 27, that is to say, toward the left in Fig. 1. One of the electrodes, 13, is connected with the contact 27 by a wire 29, in which is interposed a resistance coil 30, that may be of the adjustable type if desired. The other electrode, 14, is connected by a wire, 31, with one pole of a battery, 32, the other pole of which is connected by a wire, 33, with the bracket 25 and therefore with the contacts 24 and 26. The first mentioned pole of the battery is further connected by a wire 34, with the lever 20, and in the particular case illustrated by Fig. 1, the bulb 23 is included directly in this portion of the circuit. Fig. 1 also indicates a wire 35 leading from the bracket 25 to a switch 36 adapted to make contact with the wire 34, but these parts 35, 36 may be omitted, their only purpose being to afford a means of testing the bulb 23 by closing the switch 36, it being understood that said switch is normally open, as shown.

Fig. 1 illustrates the position of parts as they will be when the apparatus is exposed to daylight or other light sufficient to cause the gases (hydrogen and chlorine) within the vessel 10 to combine. It will be seen that the lever 20 is away from the contact 24, and no current passes through the bulb 23. A circuit is closed, however, by the engagement of the contacts 26 and 27, from the battery 32 through wire 33, contacts 26, 27, wire 29 and resistance coil 30, electrode 13, liquid 11, electrode 14, and wire 31. The current flowing through this circuit will electrolyze the hydrochloric acid in the vessel 10, producing hydrogen and chlorine, in equal amounts. As long as these gases are exposed to light, they will combine to form hydrochloric acid gas, which will immediately become dissolved in the solution or liquid 11, so that the pressure in the vessel 10 will not rise; the lever 20 will thus remain in the position shown. The use of calcium chloride as an ingredient of the liquid is for the purpose of keeping chlorine, as such, from dissolving in the solution; however, satisfactory results may be obtained even when the liquid 11 consists exclusively of a solution of hydrochloric acid. The cell or vessel 10 may be filled with glass wool, glass beads, or any inert porous material, as indicated at 37, to prevent too rapid a combination of the gases and to absorb the slight heat produced during the combination. The current passing through the liquid should be about 1/200 of an ampere, and of a minimum voltage of 1.5. When a partial vacuum is maintained in the vessel 10, as described, it is not necessary to use a second vessel or cell in order to compensate for temperature changes, (see Fig. 7), although such second cell may be used even then, if desired.

Let us now assume that while the operation is proceeding as set forth above, darkness comes on. The gases (hydrogen and chlorine) will then no longer combine, and as a result pressure will increase in the vessel 10. This will cause the lever 20 to swing on its pivot 21 in such a way as to bring the lever in engagement with the contact 24. This will close the following circuit; from battery 32 through wire 33, bracket 25, contact 24, lever 20, wire 34 and lamp 23 back to battery 32. The lamp or lamps in this circuit will thus be lighted. If the wire 33 were connected with the wire 29 directly at 28 (that is to say, if the parts 26 and 27 were omitted) the current would flow through the vessel 10 permanently while the lights 23 were burning, and the pressure in the vessel 10 would increase constantly. To avoid the danger of breakage resulting from this (and also to avoid waste of current) I have provided the switch or circuit breaker 26, 27. As soon as the pressure in the vessel reaches a predetermined point, the lever 20 will swing far enough to remove the contact 26 from engagement with the contact 27, (Fig. 4) and the circuit through the electrolytic cell will thus be broken, while the lamp operating circuit will remain closed. If then darkness disappears, the light falling on the hydrogen and chlorine in the vessel 10 will cause them to combine, and the hydrochloric acid thus formed will be dissolved again, thus reducing the pressure in the vessel 10 and causing the lever 20 to return to the position shown in Fig. 1, in which the circuit operating the lamp 23 is broken. It will be noted that when the lamp-operating circuit is closed at 20, 24, the generation of gases in the vessel 10 does not stop at once, but continues for a short while (until 26 is separated from 27) so that a slight excess pressure is produced in said vessel by the time the electrolytic circuit is broken. This insures continued engagement of the lever 20 with the contact 24 even during vibrations of the entire apparatus, and this feature is of special value when the apparatus is mounted on a body such as an automobile, which is subjected to more or less violent jars.

The sensitiveness of the device may be regulated by properly choosing or varying the resistance 30, or by the proper proportioning of other features (for instance, the distance between the electrodes 13, 14), so that the device will be sensitive to any degree of light desired.

The elasticity of ordinary glass is quite sufficient, particularly when the vessel 10 is given a tapering form, as shown, to have the bottom of the vessel move in or out as the pressure in said vessel varies.

In the construction illustrated by Figs. 1, 2, 3 and 4, the device, as described, includes an electrolytic circuit and a lamp-controlling circuit, the lamp 23 being included directly in the latter circuit. It is not necessary, however, that the lamp be in said circuit, but the controlling circuit may affect the lamp 23 indirectly. For instance, Fig. 5 shows a magnet-coil 38 included in any suitable portion of the controlling circuit, say, the wire 34, and this coil and its core may operate an armature 39 forming a switch in a circuit 40 which includes the lamp 23 and a source of electricity 41. The parts 35, 36 would be omitted in this case; otherwise the construction would be the same as in Figs. 1, 2, 3 and 4.

In case it is not desired to continue the generation of gases for a short time after the controlling circuit has been closed, the construction may be simplified somewhat, as indicated in the diagram Fig. 6. This simplified construction could be used particularly when the apparatus is not subject to jars. In this construction, one of the electrodes, say 14, and the lever 20 are connected by wires 42, 34 respectively with opposite poles of the battery 32 (and not with the same pole, as in Fig. 1). The wire 29 leads to a contact 43 located on one side of the lever 20 and adapted to be engaged thereby when the pressure in the vessel is relatively low, that is to say, under daylight or similar conditions, thus closing the electrolytic circuit. On the other side of the lever 20 is located a contact 44, corresponding to the contact 24 of Figs. 1, 3 and 4, and connected by the wire 33 with the same pole of the battery as the wire 42. In other respects, the construction is the same as in Figs. 1 to 4. Of course, in Fig. 6 also, I might employ an indirect operation, as in Fig. 5, instead of placing the lamp 23 or other device directly in the controlling circuit. Whenever the pressure in vessel 10 increases sufficiently owing to the production of gases in the dark, the lever 20 will be swung as before, so that, with the construction shown in Fig. 6, the electrolytic circuit will be broken at 43, while practically at the same time the controlling circuit will be closed at 44.

Fig. 6 also illustrates a slightly different construction of the vessel 10. Instead of having a closed glass bottom to which the plate 18 is cemented as in Figs. 1, 2, and 4, the glass part of the vessel has an open end which is closed by the plate 18, which thus forms a bottom or movable wall for the vessel 10. This plate would preferably be made of platinum, since a good joint of such material with glass can be obtained by fusing. This form of bottom will move more readily than the one shown in Figs. 1, 2, and 4 and the sensitiveness of the device will thus be increased.

Reference has been made above to the use of a second vessel or cell for the purpose of compensating for temperature changes. Thus, with a construction such as shown in Figs. 1 to 4, changes of temperature might cause the bottom of the vessel to move and thus alter the position of the lever 20 relatively to the contact 24, thereby interfering with the proper operation of the device. The apparatus shown in Figs. 1 to 4 would be so constructed as to minimize the lever movements due to temperature variations, and generally, this would be sufficient; still, there might be cases where the temperature would fluctuate through a wide range, and where a compensating arrangement would be desirable. Fig. 7 illustrates an example of such arrangement. The general arrangement would be the same as in Fig. 1, but the following additional parts would be provided. The bracket or carrier 25 would be connected with a lever 45 fulcrumed at 46 and pulled by a spring 47 against a projection 48 on the bottom of a vessel 49 suitably fastened to the base 15. This vessel or cell 49 would be closed, and similar in other respects also to the vessel 10, and would contain a gas-space and a liquid of the same character as the vessel 10; there will be no electrodes, however, in connection with the vessel 49, that is to say, it will not form an electrolytic cell nor does the vessel 49 have to be pervious to light. Fig. 7 may be assumed to represent the position of parts under the conditions of the highest temperature to which the apparatus will be exposed. If the temperature of the air should fall, the bodies of liquid in the vessels 10 and 49 will contract equally, the bottom of both vessels moving in the same direction (toward the right) and the adjacent ends of the levers 20 and 45 also moving in the same direction (toward the left). The parts would be so proportioned that the contact 24 would always remain at the same distance from the adjacent point of the switch lever 20, irrespective of temperature variations, since these would affect equally the pressure in both vessels. The distance between the lever 20 and the contact 24 would however vary as before whenever the pressure in vessel 10 would vary without a corresponding change of pressure occurring in vessel 49. It will be obvious that the operation of the circuit breaker 26, 27 will be affected slightly by the double cell arrangement of Fig. 7; that is to say, with a relatively low air temperature a greater length of time will intervene between the making of the contact at 20, 24 and the interruption of the electrolytic circuit at 26, 27 than when the temperature of the air is relatively high. This difference, however, will not affect the general operation materially.

In the forms of my invention described above, the movement of the movable wall of vessel 10 establishes, under certain conditions, a circuit for bringing into action, the lamp 23 or other device to be controlled. I desire it to be understood, however, that I do not wish to be restricted to the use of a controlling circuit, since the lever 20, or the movable wall of the vessel 10, might in some cases control the device to be governed, in other ways than electrically, for instance mechanically, or by fluid-pressure control. In other words, so far as the broad principle of my invention is concerned, it is immaterial how the pressure-variations in vessel 10 are utilized to accomplish the desired result.

I claim:

1. The method which consists in exposing to the influence of light, gases of such character as will combine under the action of light, and in utilizing the changes which variations in the intensity of light produce in the condition of such gases, to control the action of an operated device.

2. The method which consists in exposing to the influence of light, gases of such character as will combine under the influence of light, and in utilizing the changes which variations in the intensity of light produce in the condition of such gases, to control the action of an operated device and also to control the generation of such gases.

3. The method which consists in exposing to the influence of light, gases of such character as will combine under the influence of light, and in utilizing the changes which variations in the intensity of light produce in the condition of such gases, to control the generation of such gases.

4. The method which consists in confining and electrolyzing within a closed space, a liquid of such a character as to produce by electrolysis gases that will remain uncombined in the dark but will combine under the influence of light and will be dissolved in the electrolyte to reconstitute the same, gathering such gases at a point where they will be exposed to the action of light, whereby the pressure within said space will be decreased whenever the volume of the gases is reduced by their combination under the influence of light and the solution of the compound in the electrolyte, and in utilizing the variations of pressure resulting from variations in the intensity of light, to control the action of an operated device.

5. The method which consists in confining in a closed space exposed to the influence of light, gases of such character as will combine under the influence of light and a liquid that will dissolve the compound thus formed, thereby effecting a reduction of the gas volume and a corresponding reduction of the pressure within said space under the influence of light, and in utilizing the variations of pressure resulting from variations in the intensity of light, to control the action of an operated device.

6. The method which consists in confining and electrolyzing within a closed space, a liquid of such a character as to produce by electrolysis gases that will combine under the influence of light, gathering such gases at a point where they will be exposed to the action of light, whereby the pressure within said space will be reduced whenever the volume of the gases is reduced by their combination under the influence of light and the solution of the compound in said liquid, and in utilizing the variations of pressure resulting from variations in the intensity of light, to control the action of an operated device.

7. The method which consists in confining and electrolyzing within a closed space, a liquid of such a character as to produce by electrolysis gases that will combine under the influence of light, gathering such gases at a point where they will be exposed to the action of light, whereby the pressure within said space will be reduced whenever the volume of the gases is reduced by their combination under the influence of light and the solution of the compound in said liquid, in utilizing the rise of the pressure within said space to a predetermined point, for arresting the electrolytic action, and in utilizing the variations of pressure resulting from variations in the intensity of light, to control the action of an operated device.

8. The method which consists in confining in a closed space exposed to the action of light, and in the presence of heat-absorbing material, gases of such a character as will combine under the influence of light, and in utilizing the changes which variations in the intensity of light produce in the condition of such gases, to control the action of an operated device.

9. The method which consists in confining in a closed space exposed to the action of light, and in the presence of reaction-retarding material gases of such a character as will combine under the influence of light, and in utilizing the changes which variations in the intensity of light produce in the condition of such gases, to control the action of an operated device.

10. The method which consists in confining and electrolyzing in a closed space a liquid containing hydrochloric acid, gathering the resulting hydrogen and chlorine gases at a point where they will be exposed to the action of light, whereby the pressure within said space will be decreased whenever the volume of the gases is reduced by their combination under the influence of light and the solution of the compound in said liquid, and in utilizing the variations of pressure resulting from variations in the intensity of light, to control the action of an operated device.

11. The method which consists in confining and electrolyzing in a closed space, a liquid containing hydrochloric acid and calcium chloride, gathering the resulting hydrogen and chlorine gases at a point where they will be exposed to the action of light, whereby the pressure within said space will be decreased whenever the volume of the gases is reduced by their combination under the influence of light and the solution of the compound in said liquid, and in utilizing the variations of pressure resulting from variations in the intensty of light, to control the action of an operated device.

12. A device of the character described, comprising an electrolytic cell having a gas-space adapted to be exposed to the action of light, and also having a member movable as the pressure varies within said cell, an electrolyte in said cell, of the type developing gases that will combine under the influence of light, an electrolytic circuit including said electrolyte, and means controlled by the movement of said member in response to pressure variations in the cell.

13. A device of the character described, comprising an electrolytic cell having a gas-space adapted to be exposed to the action of light, and also having a member movable in response to variations of pressure within said cell, an electrolyte in said cell, consisting of a solution containing hydrochloric acid, and means controlled by the movement of said member in response to pressure variations in the cell.

14. A device of the character described, comprising an electrolytic cell having a gas-space adapted to be exposed to the action of light, and also having a member movable in response to variations of pressure within said cell, an electrolyte in said cell, consisting of a solution containing hydrochloric acid and calcium choride, and means controlled by the movement of said member in response to pressure variations in the cell.

15. A device of the character described, comprising an electrolytic cell having a gas-space adapted to be exposed to the action of light, and also having a member movable as the pressure varies within said cell, an electrolyte in said cell, of the type developing gases that will combine under the influence of light, an electrolytic circuit including said electrolyte, and means controlled by the movement of said member in response to pressure variations in the cell, said means including a switch controlling the electrolytic circuit to arrest electrolytic action under conditions of relative darkness.

16. A device of the character described, comprising an electrolytic cell having a gas-space adapted to be exposed to the action of light, and also having a member movable as the pressure varies within said cell, an electrolyte in said cell, of the type developing gases that will combine under the influence of light, an electrolytic circuit including said electrolyte, and means controlled by the movement of said member in response to pressure variations in the cell, said means including a switch controlling the said electrolytic circuit.

17. A device of the character described, comprising an electrolytic cell having a gas-space accessible to the action of light, and also having a member movable in response to variations of pressure within said cell, an electrolyte in said cell, of the type developing gases that will combine under the influence of light, an electrolytic circuit associated with said electrolyte, a controlling circuit, and a switch governing said conrolling circuit, and controlled by the movement of said member occurring in response to pressure variations in the cell.

18. A device of the character described, comprising an electrolytic cell having a gas-space accessible to the action of light, and also having a member movable in response to variations of pressure within said cell, an electrolyte in said cell, of the type developing gases that will combine under the influence of light, an electrolytic circuit associated with said electrolyte, a controlling circuit, a switch governing said controlling circuit, another switch controlling said electrolytic circuit, and means controlled by the movement of said member occurring in response to pressure variations in the cell, for controlling both of said switches.

19. A device of the character described, comprising an electrolytic cell having a gas-space accessible to the action of light, and also having a member movable in response to variations of pressure within said cell, an electrolyte in said cell, of the type developing gases that will combine under the influence of light, an electrolytic circuit associated with said electrolyte, a controlling circuit, a lever operated by the movement of said movable member and a contact adapted to be engaged by said lever to close the controlling circuit, an elastic carrier on which said contact is mounted, another contact mounted on said elastic carrier, and a co-operating contact from which said second carrier-contact is adapted to be separated, to open the electrolytic circuit, by the movement which said lever imparts to the carrier upon engaging the first-named contact.

20. A device of the character described, comprising an electrolytic cell having a gas-space adapted to be exposed to the action of light, and also having a member movable as the pressure varies within said cell, a liquid electrolyte in said cell, of the type developing gases that will remain uncombined in the dark but will combine under the influence of light and will be dissolved in the electrolyte to reconstitute the same with a simultaneous reduction of pressure in the cell, an electrolytic circuit including said electrolyte, and means controlled by the movement of said member in response to pressure variations in the cell.

21. A device of the character described, comprising a generator for producing gases of the type that will combine under the action of light, said generator having a gas-space adapted to be exposed to the action of light, and also having a member movable in response to variations of the pressure within the generator, and means, controlled by the movement of said member, for governing the operation of said generator.

22. A device of the character described, comprising an electrolytic cell having a gas-space adapted to be exposed to the action of light, and also having a member movable as the pressure varies in said cell, an electrolyte in said cell, of the type developing gases that will combine under the influence of light, a switch element controlled by the movement of said member in response to pressure variations in the cell, a contact adapted to be engaged by said switch element, temperature-controlled means for causing said contact to follow such movements of the lever as are due to temperature-variations so that the distance between said switch element and contact will not be affected by temperature variations, and means controlled by said contact and switch element.

23. A device of the character described, comprising an electrolytic cell having a gas-space adapted to be exposed to the action of light, and also having a member movable as the pressure varies in said cell, an electrolyte in said cell, of the type developing gases that will combine under the influence of light, a switch element controlled by the movement of said member in response to pressure variations in the cell, a contact adapted to be engaged by said switch element, a movable element carrying said contact, a cell containing a liquid of the same character as said electrolytic cell, and having a movable member, a connection between the last-named movable member and the contact-carrying element, and means controlled by said contact and switch element.

24. A device of the character described, comprising an electrolytic cell having a gas-space adapted to be exposed to the action of light and under a pressure below atmospheric pressure, and also having a member movable in response to variations of pressure in said cell, an electrolyte in said cell, of the type developing gases that will combine under the influence of light, and means controlled by the movement of said member in response to pressure variations in the cell.

In testimony whereof I have signed this specification.

FERDINAND LESLIE WIEDERHOLD.